(12) United States Patent
Jeong et al.

(10) Patent No.: US 9,677,553 B2
(45) Date of Patent: Jun. 13, 2017

(54) LINEAR COMPRESSOR

(71) Applicant: LG ELECTRONICS INC., Seoul (KR)

(72) Inventors: Sangsub Jeong, Seoul (KR); Kyoungseok Kang, Seoul (KR); Wonhyun Jung, Seoul (KR); Chulgi Roh, Seoul (KR); Jeonguk Byun, Seoul (KR); Jookon Kim, Seoul (KR); Sunki Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/317,218

(22) Filed: Jun. 27, 2014

(65) Prior Publication Data

US 2015/0004026 A1    Jan. 1, 2015

(30) Foreign Application Priority Data

Jun. 28, 2013  (KR) .......................... 10-2013-075512
Jun. 28, 2013  (KR) ........................ 10-2013-0075514
Oct.  4, 2013  (KR) ........................ 10-2013-0118462

(51) Int. Cl.
    *H02K 1/34*       (2006.01)
    *H02K 15/03*      (2006.01)
    (Continued)

(52) U.S. Cl.
    CPC .......... *F04B 35/045* (2013.01); *H02K 33/16* (2013.01); *H02K 1/34* (2013.01); *H02K 15/03* (2013.01)

(58) Field of Classification Search
    CPC ........ F04B 35/045; H02K 33/16; H02K 1/06; H02K 1/34; H02K 15/03
    (Continued)

(56) References Cited

U.S. PATENT DOCUMENTS 3,007,625 A    11/1961   Heinrich
3,143,281 A     8/1964   Heinrich
(Continued)

FOREIGN PATENT DOCUMENTS

CN    1480648    3/2004
CN    1508427    6/2004
(Continued)

OTHER PUBLICATIONS

Korean Office Action dated Oct. 13, 2014 issued in Application No. 10-2013-0075512.
(Continued)

*Primary Examiner* — Peter J Bertheaud
(74) *Attorney, Agent, or Firm* — KED & Associates, LLP (57) ABSTRACT

A linear compressor is provided. The linear compressor may include a shell having a refrigerant inlet, a cylinder provided inside the shell, a piston that reciprocates inside the cylinder to compress a refrigerant, a motor assembly that provides a drive force to the piston, and a magnet assembly that delivers the drive force to the piston. The magnet assembly may include a magnet frame having a cylindrical shape. A permanent magnet may be installed in or on the magnet frame. A coupling plate may be coupled to a side of the magnet frame and may include a flange coupled to an end portion of the permanent magnet.

19 Claims, 9 Drawing Sheets

(51) Int. Cl.
  *H02K 33/16* (2006.01)
  *F04B 35/04* (2006.01)
(58) Field of Classification Search
  USPC .............................. 310/14, 15; 417/415–417
  See application file for complete search history.

(56) References Cited

U.S. PATENT DOCUMENTS

| | | | |
|---|---|---|---|
| 3,813,192 A | 5/1974 | Adams | |
| 4,027,211 A | 5/1977 | Omura | |
| 4,827,163 A | 5/1989 | Bhate et al. | |
| 4,924,675 A | 5/1990 | Higham | |
| 4,932,313 A | 6/1990 | Gutknecht | |
| 4,937,481 A | 6/1990 | Vitale | |
| 5,559,378 A | 9/1996 | Oudet et al. | |
| 5,693,991 A | 12/1997 | Hiterer et al. | |
| 5,704,771 A | 1/1998 | Fujisawa | |
| 6,097,125 A * | 8/2000 | Park | H02K 1/34 310/12.16 |
| 6,273,688 B1 | 8/2001 | Kawahara | |
| 6,328,544 B1 | 12/2001 | Kawahara et al. | |
| 6,379,125 B1 | 4/2002 | Tojo | |
| 6,398,523 B1 | 6/2002 | Hur et al. | |
| 6,413,057 B1 | 7/2002 | Hong | |
| 6,435,842 B2 | 8/2002 | Song | |
| 6,561,144 B1 | 5/2003 | Muraji | |
| 6,575,716 B1 | 6/2003 | Morita et al. | |
| 6,666,662 B2 | 12/2003 | Oh | |
| 6,755,627 B2 | 6/2004 | Chang | |
| 6,793,470 B2 | 9/2004 | Song | |
| 6,863,506 B2 | 3/2005 | Park | |
| 6,875,000 B2 | 4/2005 | Bae | |
| 6,894,407 B2 * | 5/2005 | Jung | H02K 1/27 310/13 |
| 6,994,530 B2 | 2/2006 | Fujisawa et al. | |
| 7,288,862 B2 * | 10/2007 | Song | H02K 33/16 310/12.24 |
| 7,331,772 B2 | 2/2008 | Jung | |
| 7,404,701 B2 | 7/2008 | Kwon | |
| 7,478,996 B2 | 1/2009 | Kang | |
| 7,537,438 B2 | 5/2009 | Song | |
| 7,614,856 B2 | 11/2009 | Inagaki et al. | |
| 7,617,594 B2 | 11/2009 | Hyeon | |
| 7,626,289 B2 | 12/2009 | Her | |
| 7,649,285 B2 * | 1/2010 | Ueda | F25B 9/14 310/12.01 |
| 7,748,963 B2 | 7/2010 | Lee | |
| 7,748,967 B2 | 7/2010 | Park | |
| 7,775,775 B2 | 8/2010 | Cho | |
| 7,901,192 B2 | 3/2011 | Cho | |
| 7,922,463 B2 | 4/2011 | Lee | |
| 7,934,910 B2 | 5/2011 | Park | |
| 8,109,199 B2 | 2/2012 | Kim | |
| 8,109,740 B2 | 2/2012 | Kang | |
| 8,303,273 B2 | 11/2012 | Kang | |
| 8,556,599 B2 | 10/2013 | Lee | |
| 2003/0147759 A1 | 8/2003 | Chang | |
| 2004/0047750 A1 | 3/2004 | Kim et al. | |
| 2004/0061583 A1 | 4/2004 | Yumita | |
| 2004/0109777 A1 | 6/2004 | Hur | |
| 2004/0145248 A1 | 7/2004 | Jung et al. | |
| 2004/0247457 A1 | 12/2004 | Kim et al. | |
| 2005/0098031 A1 | 5/2005 | Yoon et al. | |
| 2005/0140216 A1 | 6/2005 | Lee | |
| 2005/0142007 A1 | 6/2005 | Lee | |
| 2005/0214140 A1 | 9/2005 | Lee | |
| 2006/0024181 A1 | 2/2006 | Kim | |
| 2006/0060196 A1 | 3/2006 | Kim | |
| 2006/0145797 A1 | 7/2006 | Muramatsu et al. | |
| 2006/0171825 A1 | 8/2006 | Choi | |
| 2006/0280630 A1 | 12/2006 | Lee et al. | |
| 2007/0009370 A1 | 1/2007 | Kim et al. | 417/417 |
| 2007/0110600 A1 | 5/2007 | Park | |
| 2007/0134108 A1 | 6/2007 | Her | |
| 2007/0166176 A1 | 7/2007 | Kang et al. | |
| 2008/0000348 A1 | 1/2008 | Schubert et al. | |
| 2009/0101003 A1 | 4/2009 | Kim et al. | |
| 2010/0021323 A1 | 1/2010 | Schubert | |
| 2010/0260627 A1 | 10/2010 | Kang et al. | |
| 2010/0260628 A1 | 10/2010 | Kim | |
| 2010/0260629 A1 | 10/2010 | Kang et al. | |
| 2010/0290936 A1 | 11/2010 | Kang et al. | |
| 2010/0316513 A1 | 12/2010 | Lee et al. | |
| 2011/0194957 A1 | 8/2011 | Kang | |
| 2013/0004343 A1 | 1/2013 | Cho et al. | |
| 2013/0058815 A1 | 3/2013 | Kim | |
| 2013/0195613 A1 | 8/2013 | Kim | |

FOREIGN PATENT DOCUMENTS

| | | |
|---|---|---|
| CN | 1862016 | 11/2006 |
| CN | 101133247 | 2/2008 |
| CN | 101835983 | 9/2010 |
| CN | 203770066 | 8/2014 |
| CN | 203835658 | 9/2014 |
| CN | 203867810 | 10/2014 |
| CN | 203906211 | 10/2014 |
| CN | 203906214 | 10/2014 |
| CN | 203978749 | 12/2014 |
| EP | 2 312 157 | 4/2011 |
| JP | 05-240156 A | 9/1993 |
| JP | 2000-002181 | 1/2000 |
| JP | 2001-158995 A | 6/2001 |
| JP | 2002-122072 | 4/2002 |
| JP | 2002-138954 A | 5/2002 |
| JP | 2006-280156 A | 10/2006 |
| JP | 2007-291991 | 11/2007 |
| JP | 2010-200522 A | 9/2010 |
| JP | 2013-015092 A | 1/2013 |
| KR | 10-0792460 | 1/2008 |
| KR | 10-2010-0010421 | 2/2010 |
| KR | 10-2010-0112474 | 10/2010 |
| KR | 10-2013-0118464 A | 10/2013 |
| KR | 10-2013-0118580 A | 10/2013 |
| KR | 10-2013-0075512 A | 10/2014 |
| KR | 10-2013-0075514 A | 10/2014 |
| WO | WO 02077455 A1 | 10/2002 |
| WO | WO 2007/046608 | 4/2007 |
| WO | WO 2012/088571 | 7/2012 |

OTHER PUBLICATIONS

Korean Office Action dated Oct. 13, 2014 issued in Application No. 10-2013-0075514.
Chinese Patent Certificate dated Aug. 13, 2014 issued in Application No. 201420160887.6 (patented as CN 203770066 U).
Chinese Patent Certificate dated Sep. 17, 2014 issued in Application No. 201420187800.4 (patented as CN 203835658 U).
European Search Report dated Nov. 14, 2014 issued in Application No. 14 16 8916.6.
Chinese Office Action dated Dec. 14, 2015.
Chinese Office Action dated Dec. 25, 2015.
Chinese Office Action dated Dec. 28, 2015.
(3)Chinese Office Actions dated Dec. 30, 2015.
European Search Report dated Aug. 10, 2015.
Korean Office Action dated Jul. 24, 2014.
European Search Report dated Sep. 7, 2015.
European Search Report dated Sep. 21, 2015.
European Search Report dated Sep. 25, 2015.
U.S. Appl. No. 14/280,825, filed May 19, 2014.
U.S. Appl. No. 14/316,908, filed Jun. 27, 2014.
U.S. Appl. No. 14/317,172, filed Jun. 27, 2014.
U.S. Appl. No. 14/317,041, filed Jun. 27, 2014.
U.S. Appl. No. 14/317,217, filed Jun. 27, 2014.
U.S. Appl. No. 14/317,120, filed Jun. 27, 2014.
U.S. Appl. No. 14/317,336, filed Jun. 27, 2014.
European Search Report dated Sep. 17, 2015.
European Search Report dated Oct. 2, 2015.
European Search Report dated Oct. 14, 2015.

(56) References Cited

OTHER PUBLICATIONS

Chinese Office Action date Dec. 28, 2015.
U.S. Office Action issued in U.S. Appl. No. 14/317,172 dated May 19, 2016.
U.S. Office Action issued in U.S. Appl. No. 14/317,217 dated Jun. 15, 2016.
U.S. Office Action issued in U.S. Appl. No. 14/317,120 dated Jun. 2, 2016.
Chinese Patent No. 104251196 issued Oct. 5, 2016.
United States Office Action dated Jan. 26, 2017 issued in U.S. Appl. No. 14/317,041.
U.S. Office Action dated Dec. 1, 2016 issued in U.S. Appl. No. 14/317,172.
U.S. Office Action dated Dec. 5, 2016 issued in U.S. Appl. No. 14/317,120.
U.S. Office Action dated Dec. 16, 2016 issued in U.S. Appl. No. 14/317,217.
United States Office Action dated Sep. 8, 2016 issued in U.S. Appl. No. 14/317,336.
United States Office Action dated Sep. 30, 2016 issued in U.S. Appl. No. 14/316,908.
United States Office Action dated Oct. 11, 2016 issued in U.S. Appl. No. 14/280,825.
European Search Report dated Oct. 12, 2016 issued in Application No. 16172236.8.

* cited by examiner

LINEAR COMPRESSOR

CROSS-REFERENCE TO RELATED APPLICATION(S)

The present application claims priority under 35 U.S.C. 119 and 35 U.S.C. 365 to Korean Patent Application No. 10-2013-0075512, filed in Korea on Jun. 28, 2013, No. 10-2013-0075514, filed in Korea on Jun. 28, 2013, and No. 10-2013-0118462, filed in Korea on Oct. 4, 2013, which are hereby incorporated by reference in their entirety.

BACKGROUND

1. Field

A linear compressor is disclosed herein.

2. Background

In general, compressors may be mechanisms that receive power from power generation devices, such as electric motors or turbines, to compress air, refrigerants, or other working gases, thereby increasing a pressure of the working gas. Compressors are widely used in home appliances or industrial machineries, such as refrigerators and air-conditioners.

Compressors may be largely classified into reciprocating compressors, in which a compression space, into and from which a working gas, such as a refrigerant, is suctioned and discharged, is defined between a piston and a cylinder to compress the refrigerant while the piston is linearly reciprocated within the cylinder; rotary compressors in which a compression space, into and from which a working gas, such as a refrigerant, is suctioned and discharged, is defined between a roller that is eccentrically rotated and a cylinder to compress a refrigerant while the roller is eccentrically rotated along an inner wall of the cylinder; and scroll compressors, in which a compression space, into and from which a working gas, such as a refrigerant, is suctioned and discharged, is defined between an orbiting scroll and a fixed scroll to compress a refrigerant while the orbiting scroll is rotated along the fixed scroll. In recent years, among the reciprocating compressors, linear compressors having a simple structure in which the piston is directly connected to a drive motor, which is linearly reciprocated, to improve compression efficiency without mechanical loss due to switching in moving, are being actively developed. Generally, such a linear compressor is configured to suction and compress a refrigerant while a piston is linearly reciprocated within a cylinder by a linear motor in a sealed shell, thereby discharging the compressed refrigerant.

The linear motor has a structure in which a permanent magnet is disposed between an inner stator and an outer stator. The permanent magnet may be linearly reciprocated by a mutual electromagnetic force between the permanent magnet and the inner (or outer) stator. Also, as the permanent magnet is operated in a state in which the permanent magnet is connected to the piston, the refrigerant may be suctioned and compressed while the piston is linearly reciprocated within the cylinder and then be discharged.

Figure 1:
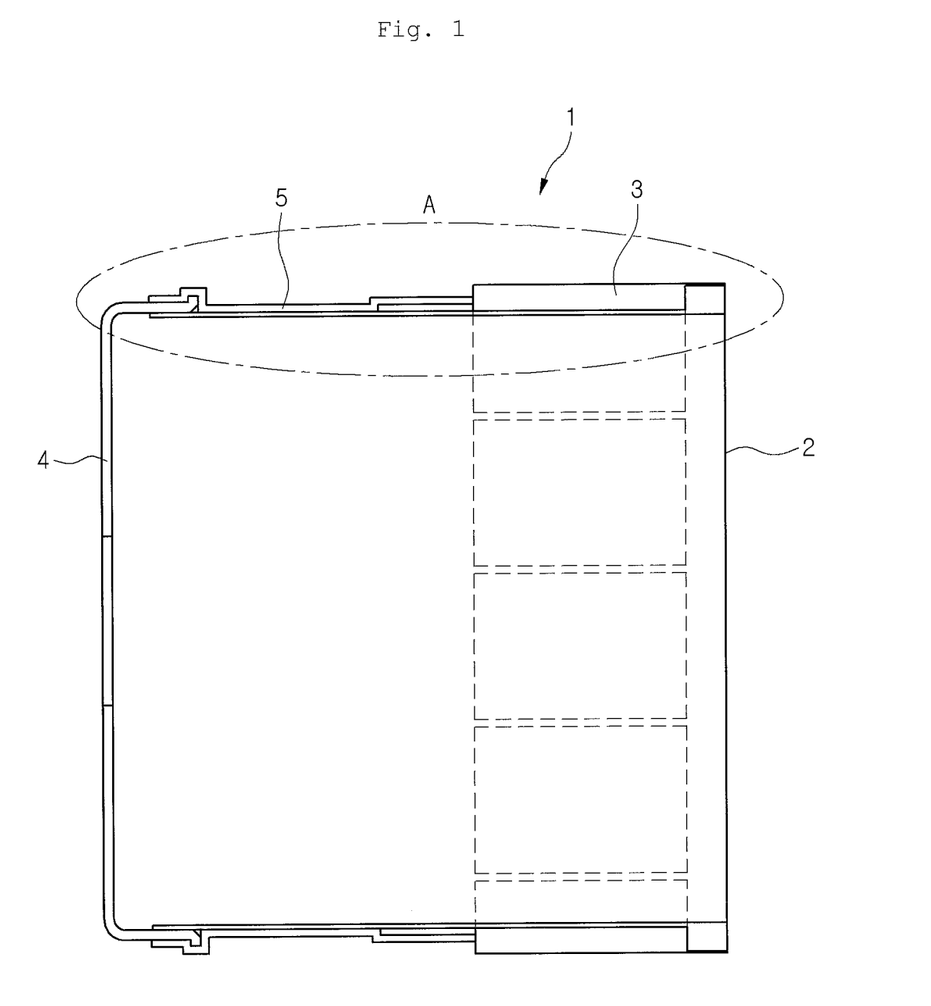
FIGS. 1 and 2 are cross-sectional views of a magnet assembly in a related art linear compressor.
Figure 2:
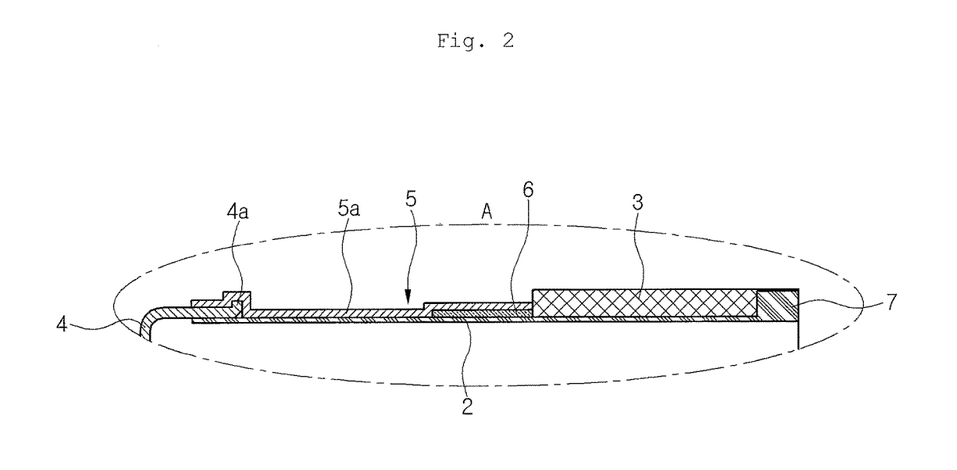

FIGS. 1 and 2 illustrate a magnet assembly in a related art linear compressor. The magnet assembly 1 of FIGS. 1-2 includes a magnet frame 2 having an approximately cylindrical shape that delivers a drive force exerted by a linear motor to a piston, and a permanent magnet 3 fixed on an outer circumference of the magnet frame 2.

The magnet assembly 1 further includes a coupling plate 4 coupled to an end portion of the magnet frame 2. The coupling plate 4 may be disposed to cover an open end portion of the magnet frame 2.

The piston may be coupled to the coupling plate 4. In addition, the piston may be coupled to the coupling plate 4 and extend inside the magnet frame 2. When the linear motor is driven, the permanent magnet 3, the magnet frame 2, the coupling plate 4, and the piston may be integrally reciprocated.

On the outer circumference of the magnet frame 2, the permanent magnet 3, a plurality of supporting members 6 and 7 to support both sides of the permanent magnet 3, and a fixing member 5 that couples the permanent magnet 3 to the coupling plate 4 are provided. The plurality of supporting members 6 and 7 include a first supporting member 6 to support a first side of the permanent magnet 3 and a second supporting member 7 to support a second side.

The permanent magnet 3 is disposed between the first and second supporting members 6 and 7. In addition, the first supporting member 6 may be positioned between the permanent magnet 3 and a flange 4a of the coupling plate 4.

In more detail, the coupling plate 4 may have a bent shape to cover at least a portion of the outer circumference of the magnet frame 2 with the open end portion of the magnet frame 2 covered. The coupling plate 4 includes the flange 4a, which forms one end portion of the coupling plate 4 and which is separately disposed from the permanent magnet 3 or the first supporting member 6. The fixing member 5 is configured to cover the first supporting member 6 and the flange 4a of the coupling plate 4.

The supporting member 5 includes a connection 5a coupled to the outer circumference of the magnet frame 2. The connection 5a may be a part of the fixing member 5 disposed between the permanent magnet 3 and the coupling plate 4.

The permanent magnet 3 may be made of a rare-earth magnet, for example, neodymium magnet or ND magnet. The ND magnets have very large magnetic flux density. In addition, as the coupling plate 4 is made of a magnetic material, the magnetic flux density generated from the ND magnets may leak outside through the coupling plate 4.

Accordingly, in order to prevent the magnetic flux generated by the ND magnet from leaking outside through the coupling plate 4, the permanent magnet 3 may be disposed a predetermined distance from the flange 4a of the coupling plate 4. In addition, as shown in FIG. 2, the connection 5a may be positioned such that the flange 4a is separated from the permanent magnet 3.

In such a way, in a case in which the coupling plate 4 is separately disposed from the permanent magnet 3 and the fixing member 5 is disposed between them, the fixing member 5 or the coupling plate 4 may be damaged in a process during which the permanent magnet 3 and the coupling plate 4 are reciprocated from side to side. In particular, in the process during which the permanent magnet 3 and the coupling plate 4 are reciprocated, compressive force and tensile force are applied to the connection 5a of the fixing member 5 and the action of the forces are repeated. Accordingly, a strength of the connection 5a becomes weakened, and accordingly, the connection 5a becomes damaged. When the connection 5a is damaged, the coupling plate 4 becomes also damaged due to interference between the permanent magnet 3 and the coupling plate 4.

Further, in order to address the above described limitations, proposals to reduce a size of the connection 5a, in particular, proposals to increase a length or a size of the permanent magnet 3 have been considered. However, ND magnets are very expensive and the proposals are very restrictive. In a case of reducing the size of the connection 5a by reducing a distance between the permanent magnet 3 and the coupling plate 4, a leaked amount of magnetic flux increases and then efficiency of the compressor is reduced.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the embodiments, examples of which are illustrated in the accompanying drawings. Where possible, like reference numerals have been used to indicate like elements and repetitive disclosure has been omitted.

A linear assembly according to an embodiment will be described in detail with reference to the accompanying drawings. Embodiments may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 3:
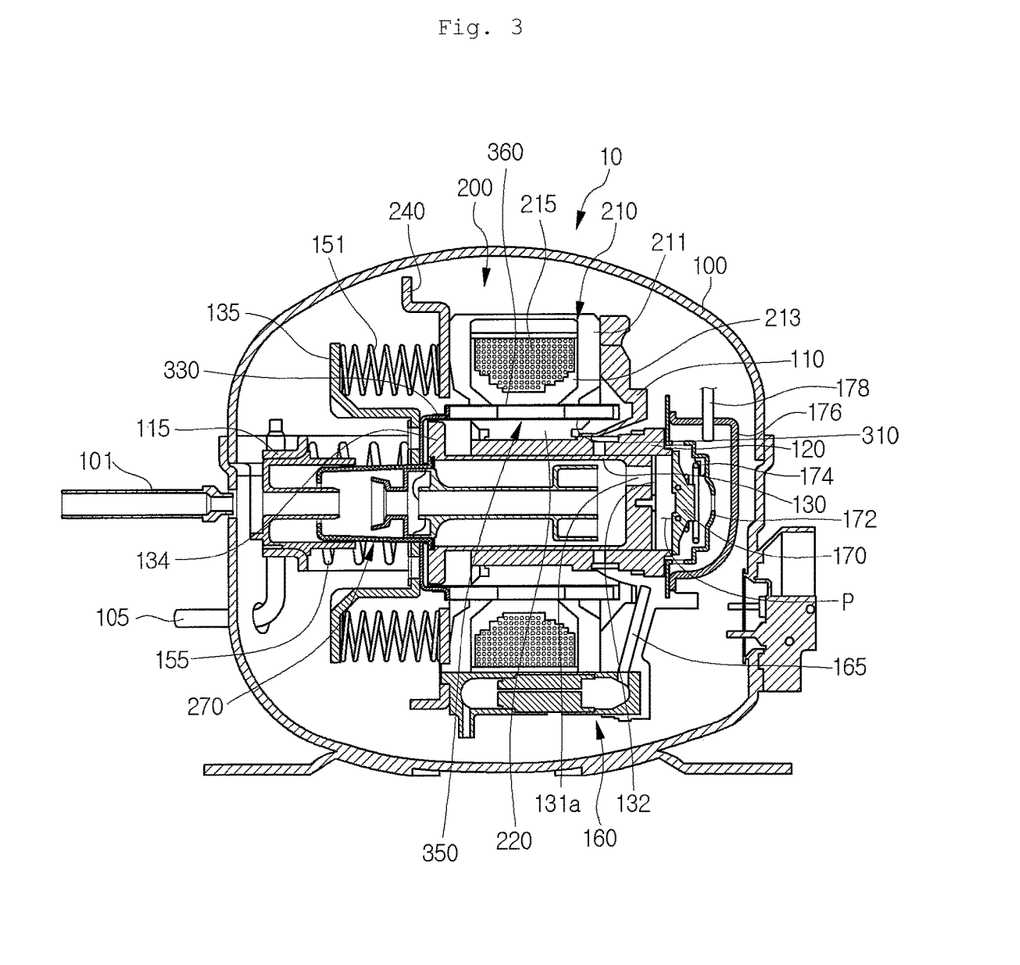
FIG. 3 is a cross-sectional view of a linear compressor according to an embodiment.

FIG. 3 is a cross-sectional view of a linear compressor according to an embodiment. Referring to FIG. 3, the linear compressor 10 may include a cylinder 120 disposed in a shell 100, a piston 130 that linearly reciprocates inside the cylinder 120, and a motor assembly 200, which may be a linear motor that exerts a drive force on the piston 130. The shell 100 may include an upper shell and a lower shell.

The cylinder 120 may be made of a nonmagnetic material, such as an aluminum-based material, for example, aluminum or aluminum alloy. As the cylinder 120 may be made of the aluminum-based material, magnetic flux generated in the motor assembly 200 may be delivered to the cylinder 120, thereby preventing the magnetic flux from being leaked to the outside of the cylinder 120. The cylinder 120 may be formed by extruded rod processing, for example.

The piston 130 may be made of an aluminum-based material, for example, aluminum or aluminum alloy, which is a nonmagnetic material. As the piston 130 may be made of the aluminum-based material, a phenomenon that the magnetic flux generated from the motor assembly 200 is delivered to the piston 130 and leaked outside the piston 130 may be prevented. The piston 130 may be formed by forging, for example.

In addition, the cylinder 120 and the piston 130 may have a same material composition ratio, that is, type and composition ratio. The piston 130 and the cylinder 120 may be made of a same material, for example, aluminum, and thus, may have a same thermal expansion coefficient. During operation of the linear compressor 10, a high-temperature environment (about 100° C.) may be created in the shell 100. As the piston 130 and the cylinder 120 may have the same thermal expansion coefficient, the piston 130 and the cylinder 120 thus may have a same amount of thermal deformation. As the piston 130 and the cylinder 120 may be thermally deformed in different amounts or directions, it is possible to prevent interference with the cylinder 120 during movement of the piston 130.

The shell 100 may include an inlet 101, into which a refrigerant may flow, and an outlet 105, from which a refrigerant compressed inside the cylinder 120 may be discharged. The refrigerant suctioned in through the inlet 101 may flow into the piston 130 via a suction muffler 270. As the refrigerant passes through the suction muffler 270, noise having various frequencies may be reduced.

A compression space P to compress the refrigerant by the piston 130 may be defined in the cylinder 120. A suction hole 131a, through which the refrigerant may be introduced into the compression space P, may be defined in the piston 130, and a suction valve 132, which may selectively open the suction hole 131a, may be disposed at a side of the suction hole 131a.

A discharge valve assembly 170, 172, and 174 to discharge the refrigerant compressed in the compression space P may be disposed at a side of the compression space P. That is, the compression space P may be formed between an end of the piston 130 and the discharge valve assembly 170, 172, and 174.

The discharge valve assembly 170, 172, and 174 may include a discharge cover 172, in which a discharge space for the refrigerant may be defined; a discharge valve 170, which may open and introduce the refrigerant into the discharge space when the pressure of the compression space P is not less than a discharge pressure; and a valve spring 174, which may be disposed between the discharge valve 170 and the discharge cover 172 to exert an elastic force in an axial direction. The term "axial direction" used herein may refer to a direction in which the piston linearly reciprocates, that is, a horizontal direction in FIG. 3.

The suction valve 132 may be disposed at a first side of the compression space P, and the discharge valve 170 may be disposed at a second side of the compression space P, that is, at an opposite side of the suction valve 132. While the piston 130 linearly reciprocates inside the cylinder 120, the suction valve 132 may be opened to allow the refrigerant to be introduced into the compression space P when the pressure of the compression space P is lower than the discharge pressure and not greater than a suction pressure. In contrast, when the pressure of the compression space P is not less than the suction pressure, the refrigerant of the compression space P may be compressed in a state in which the suction valve 132 is closed.

If the pressure of the compression space P is the discharge pressure or greater, the valve spring 174 may be deformed to open the discharge valve 170 and the refrigerant may be discharged from the compression space P into the discharge space of the discharge cover 172.

The refrigerant of the discharge space may flow into a loop pipe 178 via the discharge muffler 176. The discharge muffler 176 may reduce flow noise of the compressed refrigerant, and the loop pipe 178 may guide the compressed refrigerant to the outlet 105. The loop pipe 178 may be coupled to the discharge muffler 176 and curvedly extends to be coupled to the outlet 105.

The linear compressor 10 may further include a frame 110. The frame 110, which may fix the cylinder 120 in the shell 100, may be integrally formed with the cylinder 120 or may be coupled to the cylinder 120 by means of a separate fastening member, for example. The discharge cover 172 and the discharge muffler 176 may be coupled to the frame 110.

The motor assembly 200 may include an outer stator 210 fixed to the frame 110 and disposed so as to surround the cylinder 120, an inner stator 220 disposed apart from an inside of the outer stator 210, and a permanent magnet 350 disposed in a space between the outer stator 210 and the inner stator 220. The permanent magnet 350 may linearly reciprocate due to mutual electromagnetic force with the outer stator 210 and the inner stator 220. The permanent magnet 350 may include one pole or three poles, and may be made of a relatively inexpensive ferrite-based material.

The permanent magnet 350 may be disposed on or at an outer circumference of the magnet frame 310 of the magnet assembly 300. An end portion of the permanent magnet 350 may contact with a coupling plate 330, and the permanent magnet 350 and the coupling plate 330 may be coupled by a fixing member 360. The coupling plate 330 may be made of, for example, a nonmagnetic material, such as, stainless steel.

The coupling plate 330 may cover an open end portion of the magnet frame 310 and may be coupled to a flange 134 of the piston 130. For example, the coupling plate 330 and the flange 134 may be bolt-coupled. The flange 134 may extend in a radial direction from an end portion of the piston 130.

As the permanent magnet 350 linearly moves, the piston 130, the magnet frame 310, and the coupling plate 330 may linearly reciprocate in an axial direction with the permanent magnet 350.

The outer stator 210 may include a bobbin 213, a coil 215, and a stator core 211. The coil 215 may be wound in a circumferential direction of the bobbin 213. The coil 215 may have a polygonal section, for example, a hexagonal section. The stator core 211 may be provided such that a plurality of laminations are stacked in a circumferential direction, and may be disposed to surround the bobbin 213 and the coil 215.

When a current is applied to the motor assembly 200, the current may flow through the coil 215, a magnetic flux may be formed around the coil 215 due to the current flowing through the coil 215, and the magnetic flux may flow while a closed loop is formed along the outer stator 210 and the inner stator 220. The magnetic flux flowing along the outer stator 210 and the inner stator 220, and a magnetic flux from the permanent magnet 350 may interact with each other to generate a force to move the permanent magnet 350.

A stator cover 240 may be disposed at a side of the outer stator 210. A first end of the outer stator 210 may be supported by the frame 110, and a second end thereof may be supported by the stator cover 240.

The inner stator 220 may be fixed to an outer circumference of the cylinder 120 inside the magnet frame 310. The inner stator 220 may be configured such that a plurality of laminations are stacked at an outer side of the cylinder 120 in a circumferential direction.

The linear compressor 10 may further include a supporter 135 that supports the piston 130, and a back cover 115 that extends toward the inlet 101 from the piston 130. The back cover 115 may be disposed to cover at least a portion of the suction muffler 270.

The linear compressor 10 may include a plurality of springs 151 and 155, which may be elastic members and each have a natural frequency adjusted so as to allow the piston 130 to perform a resonant motion. The plurality of springs 151 and 155 may include a plurality of first springs 151 supported between the supporter 135 and the stator cover 240, and a plurality of second springs 155 supported between the supporter 135 and the back cover 115. The moduli of elasticity of the first and second springs 151 and 155 may be the same.

The plurality of first springs 151 may be provided at top and bottom sides of the cylinder 120 or the piston 130, and the plurality of second springs 155 may be provided at a front of the cylinder 120 or piston 130. The term "front" used herein may refer to a direction oriented toward the inlet 101 from the piston 130. The term 'rear' may refer to a direction oriented toward the discharge valve assembly 170, 172, and 174 from the inlet 101. These terms may also be equally used in the following description.

A predetermined amount of oil may be stored on an inner bottom surface of the shell 100. An oil supply device 160 to pump the oil may be provided in a lower portion of the shell 100. The oil supply device 160 may be operated by vibration generated according to a linear reciprocating motion of the piston 130 to thereby pump the oil upward.

The linear compressor 10 may further include an oil supply pipe 165 that guides flow of the oil from the oil supply device 160. The oily supply pipe 165 may extend from the oil supply device 160 to a space between the cylinder 120 and the piston 130. The oil pumped from the oil supply device 160 may be supplied to the space between the cylinder 120 and the piston 130 via the oil supply pipe 165, and perform cooling and lubricating operations.

Figure 4:
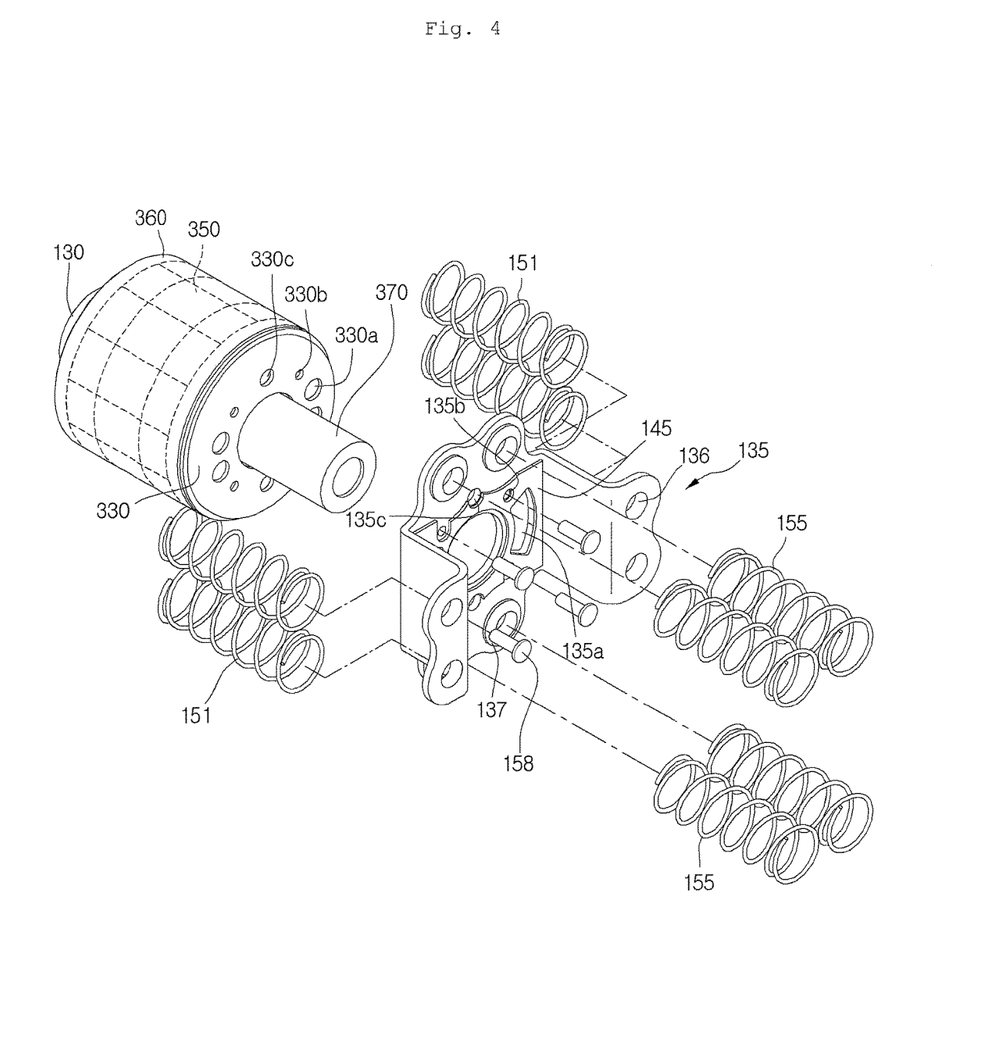
FIG. 4 is an exploded perspective view of a drive for a linear compressor according to an embodiment.

FIG. 4 is an exploded perspective view of a drive of a linear compressor according to an embodiment. Referring to FIG. 4, the drive may include piston 130 disposed to reciprocate inside cylinder 120, coupling plate 330 coupled to the piston 130, and permanent magnet 350 contact-coupled to an end portion of the coupling plate 330.

In addition, the drive may include fixing member 360 disposed to surround an outer side of the permanent magnet 350 and coupled to the coupling plate 330. The fixing member 360 and the magnet frame 310 may be made of a mixture of a glass fiber or a carbon fiber, and a resin. The fixing member 360 may maintain a coupled state of the permanent magnet 350 and the coupling plate 330.

Inside the coupling plate 330, a piston guide (not shown) may be provided which may be coupled to the flange 134 of the piston 130. The piston guide may be positioned between the flange 134 and an inner surface of the coupling plate 330. The piston 130 and the flange 134 together may be referred to as a "piston assembly".

At an outer side of the coupling plate 330, namely, at a front of the coupling plate 330, supporter 135 may be provided to movably support the piston assembly. The supporter 135 may be elastically supported inside the linear compressor 10 by springs 151 and 155.

The supporter 135 may include a plurality of spring seats 136 and 137, to which the plurality of springs 151 and 155 may be coupled. In more detail, the plurality of spring seats 136 and 137 may include a plurality of first spring seats 136 into which end portions of the plurality of first springs 151 may be seated. The plurality of first spring seats 136 may be, respectively, provided to or at top and bottom portions of the supporter 135.

For example, two first spring seats 136 may be provided to or at the top portion of the supporter 135 and two first spring seats 136 may be provided to the bottom portion of the supporter 135. Accordingly, a first end portion of each of the two first springs 151 may be coupled to the top portion of the supporter 135 and a second end portion of each of the other two first springs 151 may be coupled the bottom portion of the supporter 135.

Further, a first end portion of each of the four first springs 151 may be coupled to stator cover 240 provided to or at top and bottom sides of the supporter 135. The supporter 135 may be subjected to force or load from the stator cover 240 due to the plurality of first springs 151.

The plurality of spring seats 136 and 137 may further include a plurality of second spring seats 137, into which end portions of the second springs 155 may be seated. The plurality of second spring seat 137 may be provided to or at right and left portions of the supporter 135.

For example, two second spring seats 137 may be provided to or at a left portion of the supporter 135 and two second spring seats 137 may be provided to a right portion of the supporter 135. Accordingly, a first end portion of each of the two second springs 155 may be coupled to the left portion of the supporter 135 and a first end portion of each of the other two second springs 155 may be coupled to the right portion of the supporter 135.

Further, a second end portion of each of the four second springs 155 may be coupled to back cover 115 provided to or at the front of the piston 130. The supporter 135 may be subjected to force or load towards the rear from the back cover 115 due to the plurality of the second springs 155. As a moduli of elasticity of the plurality of first and second springs 151 and 155 may be the same, a magnitude of a force provided by the four second springs 155 may be similar to a magnitude of a force provided by the four first springs 151.

The supporter 135 may have a plurality of coupling holes 135b and 135c, to which fastening members 158 may be coupled. The plurality of coupling holes 135b and 135c may include a plurality of supporter fastening holes 135b and a plurality of supporter assembly holes 135c. The plurality of supporter fastening holes 135b may be formed in the top and bottom portions of the supporter 135 and the plurality of supporter assembly holes 135c may be formed in the right and left portions of the supporter 135.

For example, two supporter fastening holes 135b may be formed in the top portion and two may be formed in the bottom portion. The supporter assembly holes 135c may be, respectively, formed in the right and left portions. In addition, the supporter fastening holes 135b and the supporter assembly holes 135c may have different sizes from each other.

The coupling plates 330, the piston guide, and the flange 134 of the piston assembly may have coupling holes formed in correspondence with the holes 135b and 135c. Fastening members 158 may penetrate the coupling holes and be coupled to the coupling plate 330, the piston guide, and the flange 134. For example, in the coupling plate 330, connection member fastening holes 330b and connection member assembly holes 330c may be formed which respectively correspond to the supporter fastening holes 135b and the supporter assembly holes 135c.

Supporter communication holes 135a may be formed in the supporter 135 in order to reduce resistance of a flow of a gas inside the linear compressor 10. The supporter communication holes 135a may be formed by cutting out at least a portion of the supporter 135, and may be, respectively, formed in the top and bottom portions.

In addition, communication holes corresponding to the supporter communication holes 135a may be, respectively, formed in the coupling plate 330, the piston guide, and the flange 134 of the piston assembly. For example, the coupling plate 330 may have connection member communication holes 330a corresponding to the supporter communication holes 135a in the coupling plate 330a. The gas may flow through the communication holes formed in the coupling plate 330, the piston guide, the flange 134, and the supporter 135, and accordingly, gas flow resistance may be reduced.

The drive may include a balance weight 145 coupled to the supporter 135 to reduce vibration occurring during a drive process of the drive. The balance weight 145 may be coupled to a front surface of the supporter 135.

The balance weight 145 may include a plurality of weight fastening holes corresponding to the supporter fastening holes 135b and weight communication holes corresponding to the supporter communication holes 135a are formed. The balance weight 145 may be coupled to the supporter 135, the coupling plate 330, and the flange 300 of the piston 130 by the fastening member 158.

The drive may further include suction muffler 270 to reduce flow noise of a refrigerant. The suction muffler 270 may penetrate through the supporter 135, the balance weight 145, the coupling plate 330, and the flange 134 of the piston 130 to extend inside the cylinder 120 and the piston 130. In addition, at least a portion of the suction muffler 270 may be positioned and fixed between the flange 134 and the piston guide.

Figure 5:
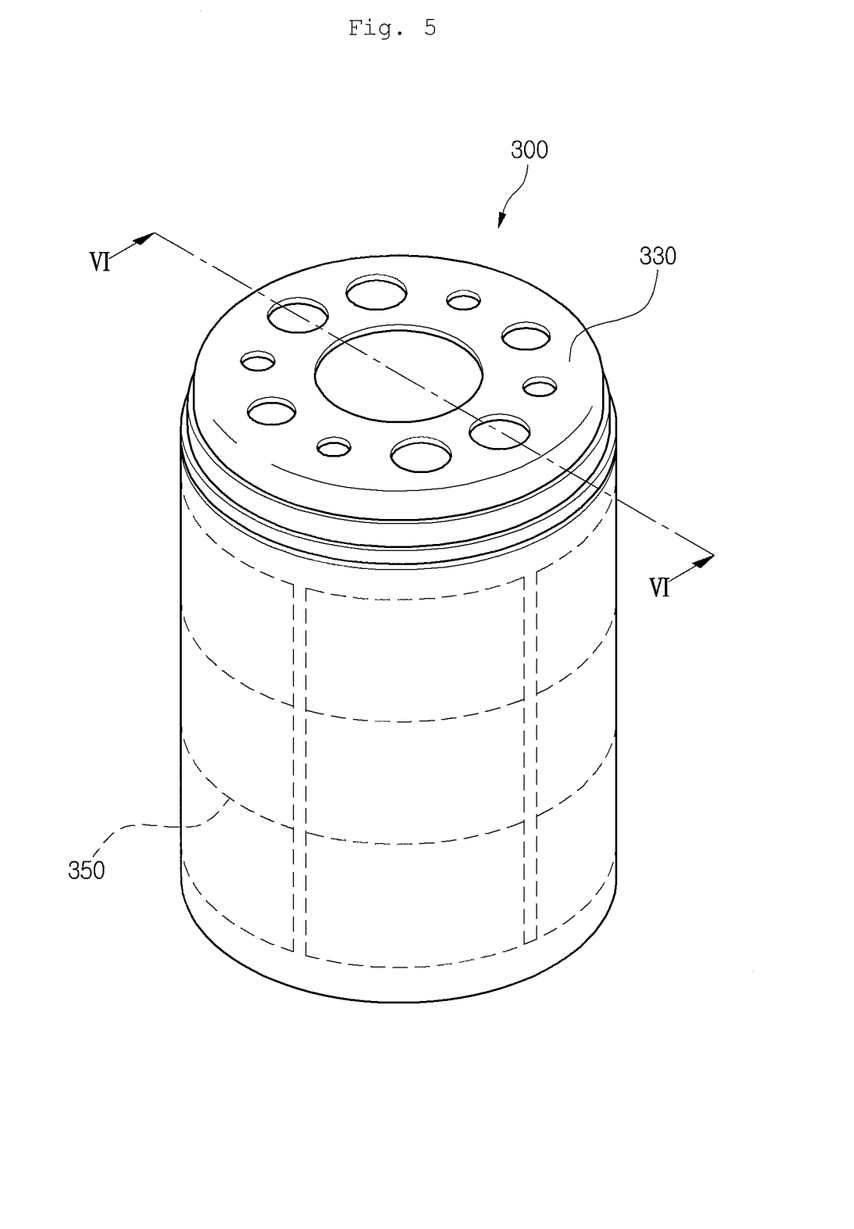
FIG. 5 is a perspective view of a magnet assembly of a linear compressor according to an embodiment.
Figure 6:
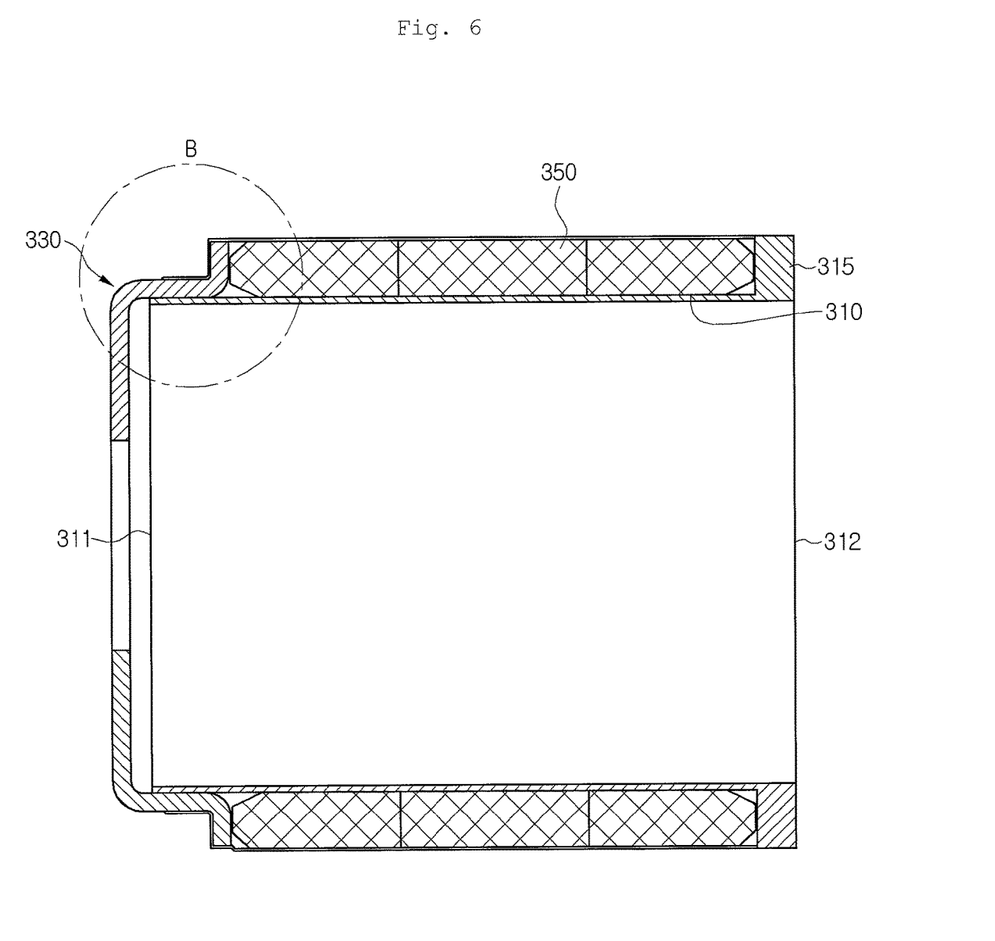
FIG. 6 is a cross-sectional view, taken along line VI-VI of FIG. 5.
Figure 7:
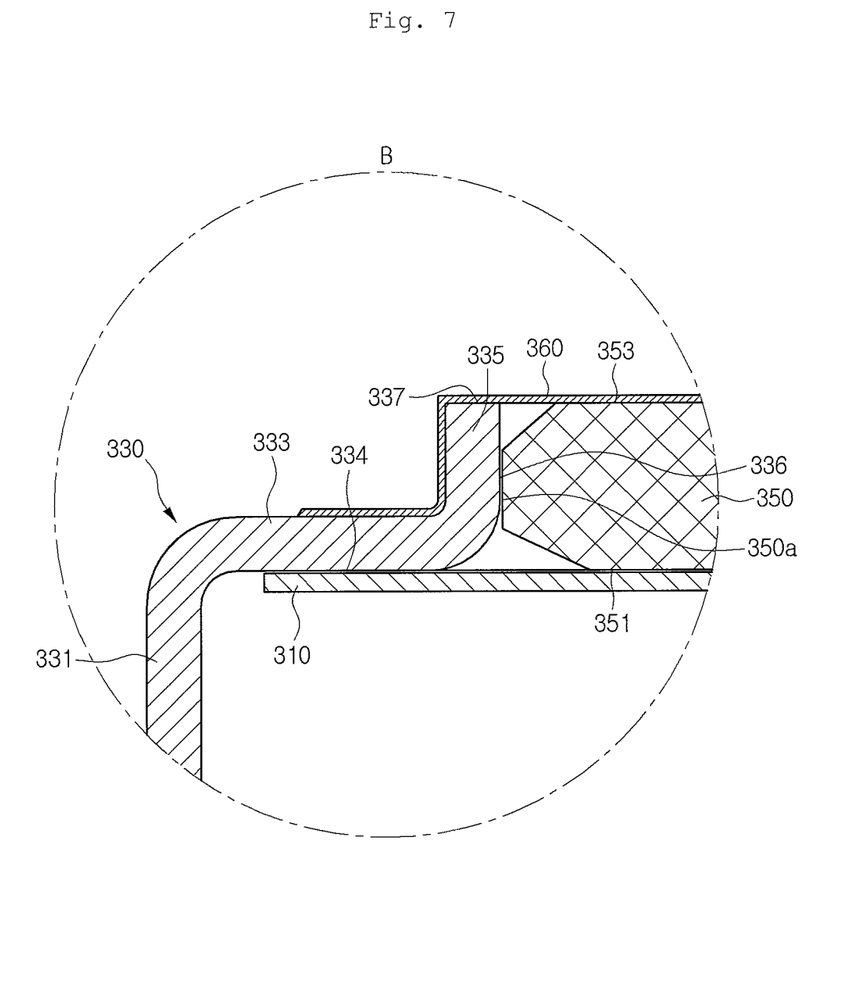
FIG. 7 is a partial cross-sectional view of a portion "B" of FIG. 6 enlarged.

FIG. 5 is a perspective view of a magnet assembly of a linear compressor according to an embodiment. FIG. 6 is a cross-sectional view, taken along a line VI-VI of FIG. 5. FIG. 7 is a partial cross-sectional view of a portion "B" of FIG. 6 enlarged.

Referring to FIGS. 5 to 7, the magnet assembly 300 according to this embodiment may include magnet frame 310 having an approximate cylindrical shape and permanent magnet 350 installed on an outer circumference of the magnet frame 310. The inner stator 220, the cylinder 120, and the piston 130 may be disposed inside the magnet frame 310, and the outer stator 210 may be disposed outside the magnet frame 310 (See FIG. 3).

Both end portions of the magnet frame 310 may include openings 311 and 312. The openings 311 and 312 may include a first opening 311 formed in a first end portion of the magnet frame 310 and a second opening 312 formed in a second end portion of the magnet frame 310. For example, the first end portion may be a "top end portion" and the second end portion may be a "bottom" end portion.

The magnet frame 310 may have coupling plate 330 coupled thereto, which may be coupled to the flange 134 of the piston 130. In more detail, the coupling plate 330 may be coupled to the first end portion of the magnet frame 310 to cover the first opening 311.

On an outer circumference of the magnet frame 310, a support 315 may be provided to support the permanent magnet 350. The support 315 may abut a first end portion of the permanent magnet 350 and be disposed on or at an outer side of the second opening 312.

In addition, a second end portion of the permanent magnet 350 may abut the coupling plate 330. That is, the permanent magnet 350 may be disposed between the coupling plate 330 and the support 315. The permanent magnet 350 may be prevented from being detached from the magnet frame 310 by the coupling plate 330 and the support 315.

Hereinafter, configuration of the coupling plate 330 and the coupling structure with the permanent magnet 350 will be described in detail hereinbelow.

Referring to FIG. 7, the coupling plate 330 according to this embodiment may include a piston coupling portion 331 coupled to the flange 134 of the piston 130, a side extension portion 333 that extends from the piston coupling portion 331, and a flange portion 335 disposed to contact the permanent magnet 330. The piston coupling portion 331 may be a portion coupled to the flange 134 of the piston 130 and the supporter 135, and may include connection member communication holes 330*a*, connection member fastening holes 330*b*, and connection member assembly holes 330*c*. In addition, the piston coupling portion 331 may shield the first opening 311.

The side extension portion 333 may be a portion that extends from the first opening 311 to be diagnosed on or at an outer circumference of the magnet frame 310. The side extension portion 333 may extend from the first opening 311 towards the second opening 312 at an outer side of the magnet frame 310. The side extension portion 333 may include a coupling surface 334 coupled to at least a portion of the outer circumference of the magnet frame 310.

The flange 335 may extend in an outer radial direction from the side extension portion 333. The flange 335 may include a contact 336 coupled to an end portion 350*a* of the permanent magnet 350 and an end portion 337 that extends substantially in parallel to a second surface 353 of the permanent magnet 350. A surface that passes through the end portion 337 of the flange 335 and the second surface 353 of the permanent magnet 350 may be positioned inside the fixing member 360.

The contact 336 may extend substantially perpendicular to the outer circumference of the magnet frame 310, namely, in a radial direction. The end portion 337 may extend substantially perpendicular to the contact 336.

The permanent magnet 350 may include a first surface 351 disposed at the outer circumference of the magnet frame 310, and the second surface 353, which may extend opposite to the first surface 351. The first surface 351 may extend substantially parallel to the outer circumference of the magnet frame 310 and the second surface 353 may extend substantially parallel with the first surface 351.

Further, the permanent magnet 350 may include a magnet end portion 350*a* coupled to the contact 336. The magnet end portion 350*a* may be configured to extend in a substantially parallel direction with the contact 336 and be contact-coupled to the contact 336.

As the contact 336 of the coupling plate 330 and the magnet end portion 350*a* of the permanent magnet 350 may contact and be coupled, a force may be easily delivered from the permanent magnet 350 to the coupling plate 330. In addition, as the piston 130 coupled to the coupling plate 330 may reciprocate, a loss in a power delivery process may be reduced.

In addition, as a fixing member is not disposed between the coupling plate 330 and the permanent magnet 350 as in the related art (see FIGS. 1 and 2), a phenomenon that the fixing member may be damaged by a compressive force or a tensile force exerted between the coupling plate 330 and the permanent magnet 350 may be prevented.

The fixing member 360 to couple the permanent magnet 350 and the coupling plate 330 may be disposed at the outer side of the permanent magnet 350 and the coupling plate 330. The fixing member 360 may be coupled to the second surface 353 of the permanent 30 to extend to the end portion 337 of the flange 335 and the outer surface of the side extension portion 333.

The fixing member 360 may be made of a mixture of a glass fiber or a carbon fiber, and a resin. In more detail, the fixing member 360 may include a taping member having a predetermined tensile or compressive strength. In addition, the fixing member 360 may include a plurality of taping members and be configured to enhance a strength thereof. For example, the plurality of taping members may be disposed to form a plurality of layers.

On the other hand, a virtual straight line from which a coupling surface 334 of the side extension portion 333 may extend, and a virtual straight line from which the first surface 351 of the permanent magnet 350 may extend may form an identical straight line. In addition, a virtual straight line from which the end portion 337 of the flange 335 may extend and a virtual straight line of the second surface 353 of the permanent magnet 350 may form an identical straight line.

In other words, a virtual surface from which the coupling surface 334 may extend and a virtual surface from which the first surface 351 may extend may form an identical surface. A virtual surface from which the end portion 336 may extend and a virtual surface from which the second surface 353 may extend may form an identical surface.

With respect to the first and second surfaces 351 and 353 of the permanent magnet 350, both sides of the coupling plate 330, namely, the coupling surface 334 and the end portion 337 may extend substantially in parallel. Accordingly, when the tensile force is exerted between the permanent magnet 350 and the coupling plate 330, the fixing member 360 may be prevented from being curved and damaged.

Hereinafter, another embodiment will be described. Compared to the previous embodiment, as this embodiment is similar to the previous embodiment configuration, only the differences are described and repetitive description has been omitted.

Figure 8:
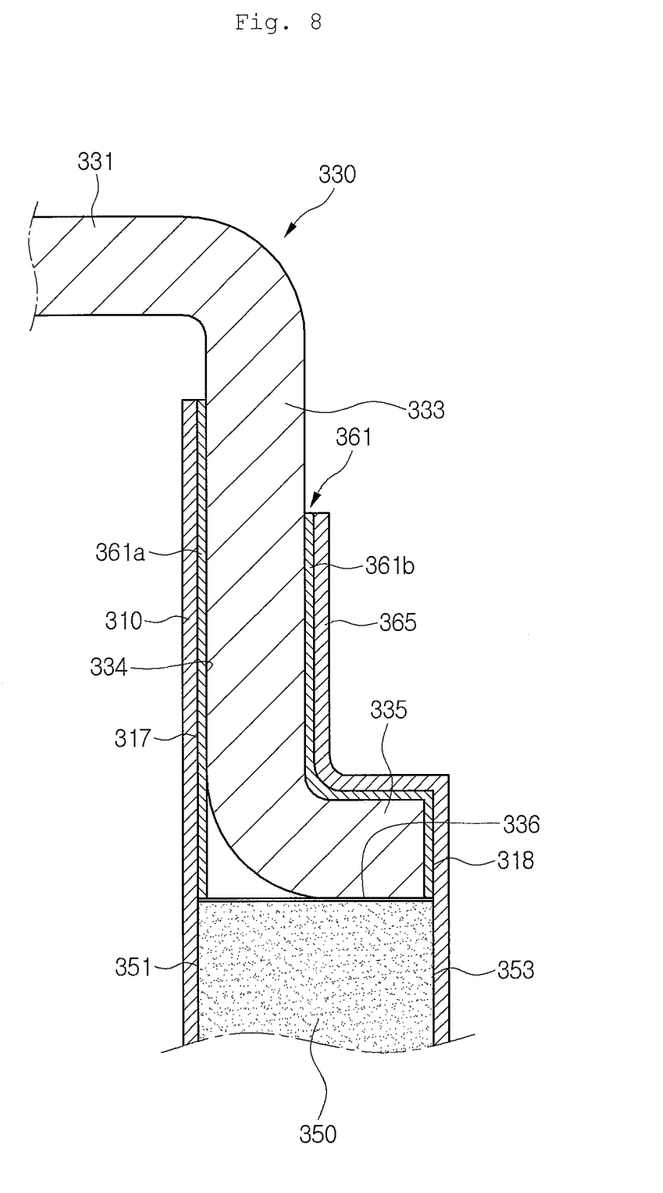
FIG. 8 is a partial cross-sectional view of a magnet assembly according to another embodiment.

FIG. 8 is a partial cross sectional view of a magnet assembly according to another embodiment. Referring to FIG. 8, the magnet assembly 300 according to this embodiment may include magnet frame 310, coupling plate 330 coupled to the magnet frame 310, permanent magnet 350 contact-coupled to an end portion of the coupling plate 330, and a plurality of fixing members 361 and 365 to couple the coupling plate 330 and the permanent magnet 350. The plurality of fixing members 361 and 365 may be made of a mixture of a glass fiber or a carbon fiber, and resin, similar to the fixing member 360 of the previous embodiment.

The plurality of fixing members 361 and 365 may include a plurality of first fixing members 361 coupled to both sides of the coupling plate 330, and a second fixing member 365 coupled to an outer side of a second member 361*b* among the first fixing members 361 to extend to the permanent magnet 350.

The plurality of first fixing members 361 may include a first member 361*a* coupled between the magnet frame 310 and the side extension portion 333 of the coupling plate 330, and the second member 361*b* coupled between an outer surface of the side extension portion 333 and the second fixing member 365. That is, the coupling surface 334 of the side extension portion 333 may be coupled to the magnet frame 310 by the first member 361*a*. In addition, the end portion 337 of the flange 335 may be coupled to the second fixing member 365 by the second member 361*b*.

In brief, the separate first fixing member 361 may be disposed on outer sides of the side extension portion 333 and the flange 335, and the magnet frame 310 and the second fixing member 365 may be coupled to an outer side of the fixing member 361, as described with respect to the previous embodiment.

In a surface on which the magnet frame 310 is coupled to the first member 361a, a first boundary surface 317 may be formed. In addition, a second boundary surface 318 may be formed in a portion of the second member 361b, which may be coupled to the end portion 337, and a surface to which the second fixing member 365 may be coupled.

A virtual straight line (or surface) from which the first boundary surface 317 may extend and a virtual straight line (or surface) from which the first surface 351 of the permanent magnet 350 may extend may form an identical straight line (or surface). In such a way, as both side surfaces of the permanent magnet 350 and both surfaces of the coupling plate 330 coupled to the permanent magnet 350, that is, the first and second boundary surfaces 317 and 318 may extend substantially in parallel, when a tensile force is exerted between the permanent magnet 350 and the coupling plate 330, the fixing members 361 and 365 may be prevented from being bent and damaged.

Figure 9:
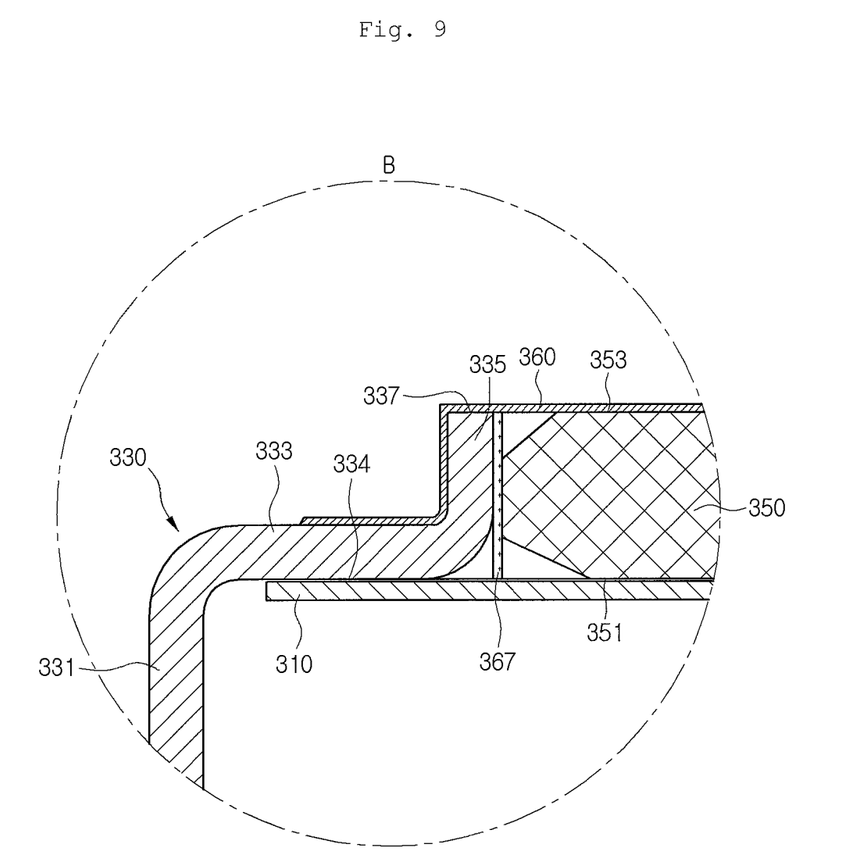
FIG. 9 is a partial cross-sectional view of a magnet assembly according to another embodiment.

FIG. 9 is a partial cross-sectional view of a magnet assembly according to another embodiment. Referring to FIG. 9, the magnet assembly 300 according to this embodiment may include a permanent magnet 350 positioned at an end portion of the coupling plate 330 and an intermediate supporting member 367 positioned between the coupling plate 330 and the permanent magnet 350 and having a plate shape.

The intermediate supporting member 367 may be disposed between an end portion of the flange 335 and the end portion 350a (see FIG. 7) of the permanent magnet 350 to support the flange 335 and the permanent magnet 350. The intermediate supporting member 367 may be coupled to the magnet frame 310 and extend in an outer direction of the magnet frame 310. In addition, the intermediate supporting member 367 may be fixed by the fixing member 360. That is, a first end portion of the intermediate supporting member 367 may be coupled to the magnet frame 310, and a second end portion may be coupled to the fixing member 360.

For example, the intermediate supporting member 367 may be made of a metal-based material and support the coupling plate 330 and the permanent magnet 350, while delivering a force exerted from any one of the coupling plate 330 and the permanent magnet 350 to the other. For example, the intermediate supporting member 367 may be made of a taping-based material and may fix the coupling plate 330 and the permanent magnet 350.

As described above, as the intermediate supporting member 367 of a plate shape may be installed between the permanent magnet and the end portion of the flange and a force exerted between the permanent magnet and the coupling plate may be delivered by the intermediate supporting member 367, the fixing member 360, and the coupling plate 330 may not be damaged in a process during which the permanent magnet 350 and the coupling plate 330 reciprocate from side to side.

According to embodiments, as a permanent magnet and a coupling plate may be disposed to be contactable, a force exerted between the permanent magnet and the coupling plate may be delivered and damage on a fixing member, which couples the permanent magnet and the coupling plate, may be prevented.

More particularly, as a flange of the coupling plate contacts with the permanent magnet, and the fixing member may not be positioned between the coupling plate and the permanent magnet, damage on the fixing member by the compressive force exerted between the coupling plate and the permanent magnet may be prevented.

In addition, as both end portions of the coupling plates may be disposed to be matched with or parallel with both cross-sections of the permanent magnet, damage on the fixing member by tensile force exerted between the coupling plate and the permanent magnet may be prevented.

Further, as the permanent magnet may be made of a ferrite-based material, the magnetic flux density may be smaller, compared to a ND magnet. Accordingly, an amount of magnetic flux leaked from the permanent magnet may be reduced and operation efficiency of the compressor improved. In addition, manufacturing costs of the compressor may be reduced by employing a cheaper ferrite-based material as the permanent magnet.

In addition, as the coupling plate may be made of a nonmagnetic material, a phenomenon that the magnetic flux is delivered from the permanent magnet and leaked outside may be prevented.

Moreover, efficiency of the compressor may be improved, as the cylinder and piston may be made of a nonmagnetic material, for example, aluminum. In addition, a phenomenon that the magnetic flux generated from a motor assembly leaks outside the cylinder may be prevented.

Embodiments disclosed herein provide a linear compressor having improved compressing efficiency and reliability.

Embodiments disclosed herein provide a linear compressor that may include a shell, in which a refrigerant suction part or inlet may be disposed; a cylinder provided inside the shell; a piston that reciprocates inside the cylinder; a motor assembly that provides a drive force for movement of the piston; and a magnet assembly that delivers the drive force exerted by the motor assembly to the piston. The magnet assembly may include a magnet frame having a cylinder or cylindrical shape; a permanent magnet installed in the magnet frame; and a coupling plate coupled to one side of the magnet frame and including a flange part or flange coupled to an end portion of the permanent magnet.

The coupling plate may further include a piston coupling part coupled to the piston, and a side extension part that extends from the piston coupling part and laid on an outer circumference of the magnet frame. The flange part may be bent perpendicularly in an outer radial direction of the frame from the side extension part. Further, the flange part may include a contact part or contact coupled to an end portion of the permanent magnet.

The linear compressor may further include a fixing member coupled to the permanent magnet and the coupling plate.

The permanent magnet may include a first surface coupled to an outer circumference of the magnet frame, and a second surface disposed in a direction opposite to the first surface.

The side extension part may include a coupling surface coupled to the outer circumference of the magnet frame, and the coupling surface and the first surface of the permanent magnet may be formed on the outer circumference of the magnet frame.

A virtual surface from which the coupling surface extends may form an identical surface to a virtual surface from which the first surface of the permanent magnet extends. A surface passing through an end portion of the flange part and the second surface of the permanent magnet may be formed on an inner surface of the fixing member. A virtual surface from which the end portion of the flange part extends may form an identical surface to a virtual surface from which the second surface of the permanent magnet extends.

The fixing member may include a plurality of first fixing members coupled to both sides of the coupling plate, and a second fixing member coupled to at least a portion of the plurality of first fixing members and the permanent magnet. The plurality of first fixing members may include a first member coupled between the magnet frame and the side extension part of the coupling plate, and a second member coupled between an outer surface of the side extension part and the second fixing member.

The linear compressor may further include a first boundary surface that forms a coupling surface of the first member with the magnet frame, and a second boundary surface that forms a coupling surface of the second fixing member with a part coupled to the end portion of the flange part of the second member.

A virtual surface from which the first boundary surface extends and a virtual surface from which the first surface of the permanent magnet extends may form an identical surface. A virtual surface from which the second boundary surface extends and a virtual surface from which the second surface of the permanent magnet extends may form an identical surface.

The linear compressor may further include an intermediate supporting member intervened between the permanent magnet and the flange part of the coupling plate and having a plate shape. The linear compressor may further include a fixing member coupled to the permanent magnet and the coupling plate. The intermediate supporting member may extend from the magnet frame towards the fixing member.

The permanent magnet may be made of a ferrite-based material. The coupling plate may be made of a stainless steel-based material.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor, comprising:
   a shell having a refrigerant inlet;
   a cylinder provided inside of the shell;
   a piston that reciprocates inside of the cylinder in an axial direction;
   a motor assembly that provides a drive force to the piston; and
   a magnet assembly that delivers the drive force to the piston, wherein the magnet assembly includes:
   a magnet frame;
   a permanent magnet installed on the magnet frame;
   a coupling plate coupled to the magnet frame and including a piston coupling portion coupled to the piston, a side extension portion that extends from the piston coupling portion in the axial direction and which is provided at an outer circumferential surface of the magnet frame, and a flange that extends in a radial direction from the side extension portion and is coupled to an end portion of the permanent magnet; and
   a fixing member coupled to the side extension portion, the flange, and the permanent magnet.

2. The linear compressor according to claim 1, wherein the flange is directly coupled to the end portion of the permanent magnet.

3. The linear compressor according to claim 1, wherein the flange is bent substantially perpendicularly in an outer radial direction with respect to the magnet frame from the side extension portion.

4. The linear compressor according to claim 1, wherein the flange includes a contact coupled to the end portion of the permanent magnet.

5. The linear compressor according to claim 1, wherein the permanent magnet includes:
   a first surface coupled to the outer circumferential surface of the magnet frame; and
   a second surface provided opposite to the first surface.

6. The linear compressor according to claim 5, wherein the side extension portion includes a coupling surface coupled to the outer circumferential surface of the magnet frame, and wherein the coupling surface and the first surface of the permanent magnet are provided in a same plane.

7. The linear compressor according to claim 6, wherein an interface between the permanent magnet and the fixing member extends substantially parallel to an interface between the permanent magnet and the magnet frame.

8. The linear compressor according to claim 5, wherein a surface at an end portion of the flange and the second surface of the permanent magnet are coupled to an inner surface of the fixing member.

9. The linear compressor according to claim 8, wherein an interface between the second surface of permanent magnet and the fixing member and an interference between the end portion of the flange and the fixing member are provided in a same plane.

10. The linear compressor according to claim 1, wherein the fixing member includes
    a plurality of first fixing members coupled to both sides of the coupling plate; and
    a second fixing member coupled to at least a portion of the plurality of first fixing members and the permanent magnet.

11. The linear compressor according to claim 10, wherein the plurality of first fixing members includes:

a first member provided between the magnet frame and the side extension portion of the coupling plate; and a second member provided between an outer surface of the side extension portion and the second fixing member.

12. The linear compressor according to claim 11, further including:

a first boundary surface that forms a coupling surface of the first member with the magnet frame; and a second boundary surface that forms a coupling surface of the second fixing member with a portion of the second member coupled to the end portion of the flange.

13. The linear compressor according to claim 12, wherein a virtual surface through which the first boundary surface extends and a virtual surface from which the first surface of the permanent magnet extends form an identical surface.

14. The linear compressor according to claim 12, wherein a virtual surface from which the second boundary surface extends and a virtual surface from which the second surface of the permanent magnet extends form an identical surface.

15. The linear compressor according to claim 1, further including an intermediate supporting member provided between the permanent magnet and the flange of the coupling plate and having a plate shape.

16. The linear compressor according to claim 15, further including a fixing member coupled to the permanent magnet and the coupling plate, wherein the intermediate supporting member extends from the magnet frame towards the fixing member.

17. The linear compressor according to claim 1, wherein the permanent magnet is made of a ferrite-based material.

18. The linear compressor according to claim 1, wherein the coupling plate is made of a stainless steel-based material.

19. A linear compressor, comprising:

a shell having a refrigerant inlet;

a cylinder provided inside of the shell;

a piston that reciprocates inside of the cylinder;

a motor assembly that provides a drive force to the piston; and a magnet assembly that delivers the drive force to the piston, wherein the magnet assembly includes:

a magnet frame;

a permanent magnet installed on the magnet frame;

a coupling plate coupled to the magnet frame and including a piston coupling portion coupled to the piston, a side extension portion that extends from the piston coupling portion, in an axial direction, and a flange that extends in a radial direction from the side extension portion and is coupled to an end portion of the permanent magnet;

a plurality of first fixing members including:

a first member provided between the magnet frame and an inner circumferential surface of the side extension portion; and a second member provided at an outer circumferential surface of the side extension portion; and a second firing member provided at an outer circumferential surface of the second member.

\* \* \* \* \*